(No Model.) 3 Sheets—Sheet 1.
H. W. HEADLAND.
SECONDARY BATTERY.
No. 589,830. Patented Sept. 14, 1897.
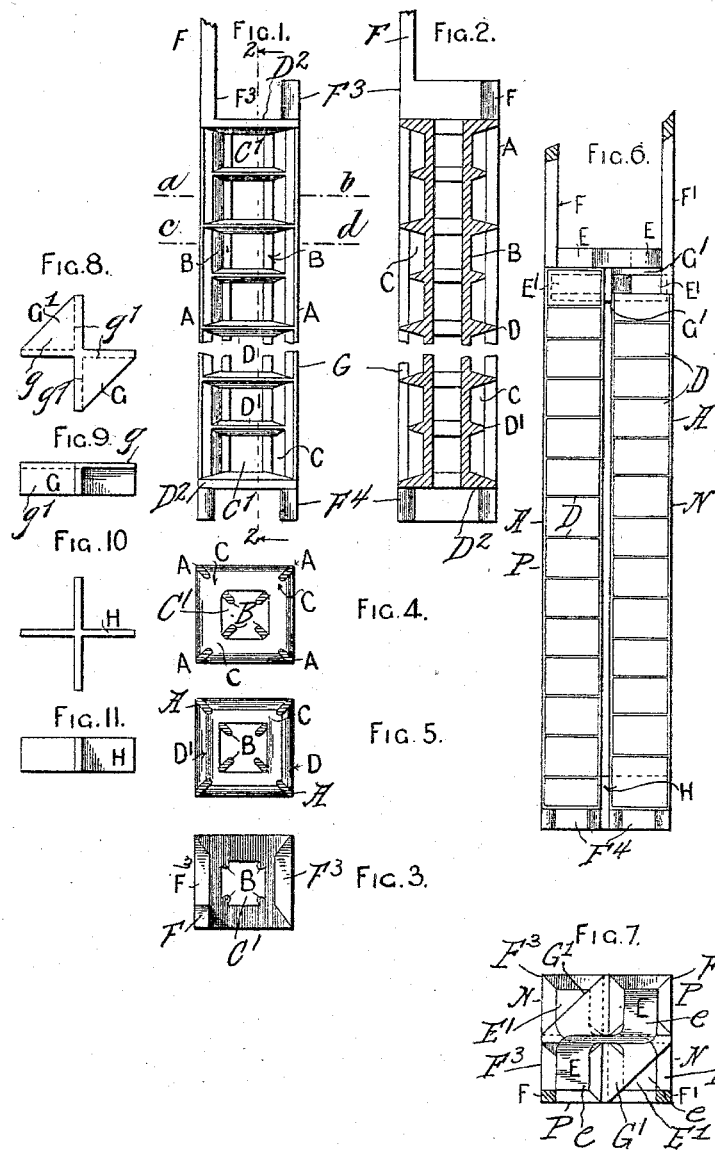
Witnesses
Inventor
Henry William Headland (No Model.) 3 Sheets—Sheet 2.
H. W. HEADLAND.
SECONDARY BATTERY.
No. 589,830. Patented Sept. 14, 1897.
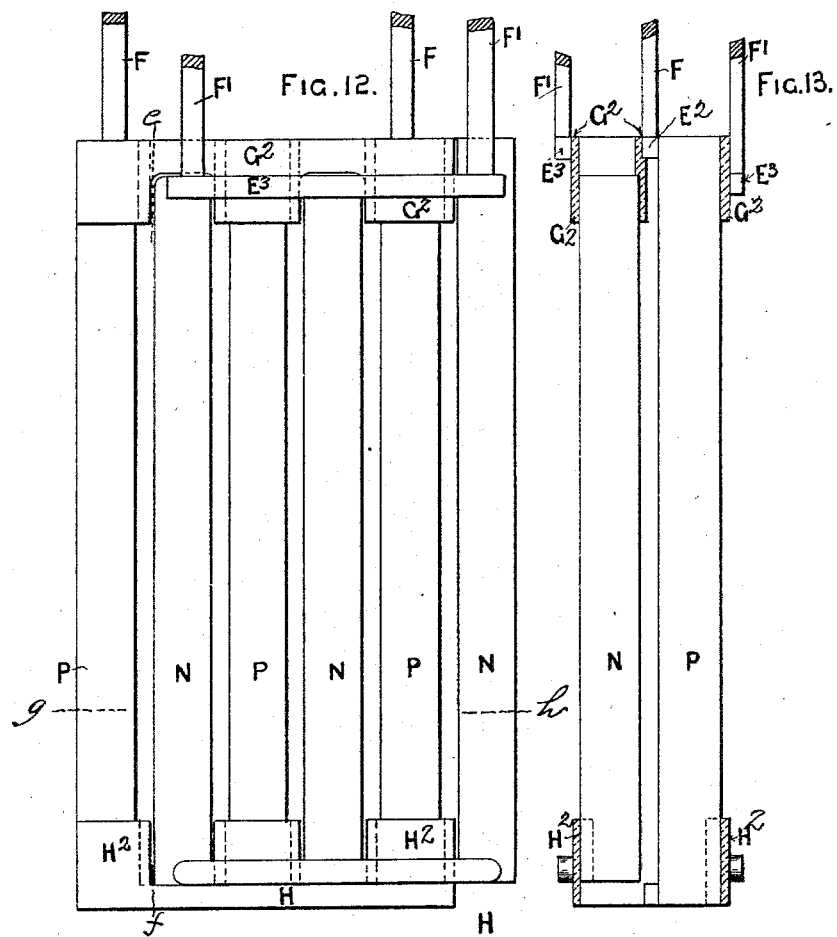
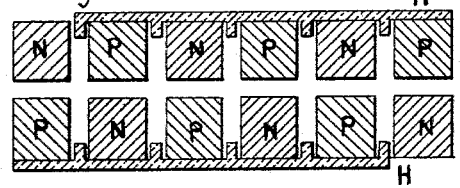
Fig. 14.
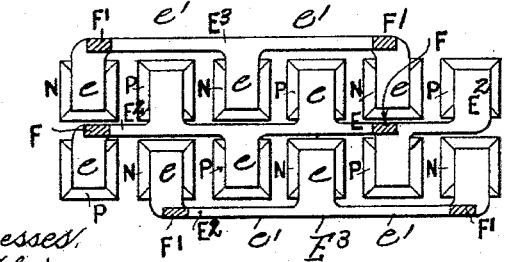
Fig. 15.
Witnesses:
Inventor:
Henry William Headland.
by (No Model.) 3 Sheets—Sheet 3.
H. W. HEADLAND.
SECONDARY BATTERY.
No. 589,830. Patented Sept. 14, 1897.
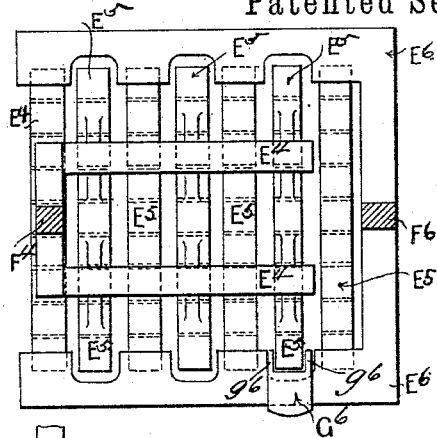
Fig. 17.
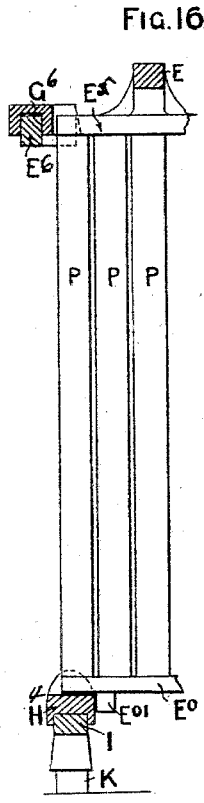
Fig. 16.ᴬ
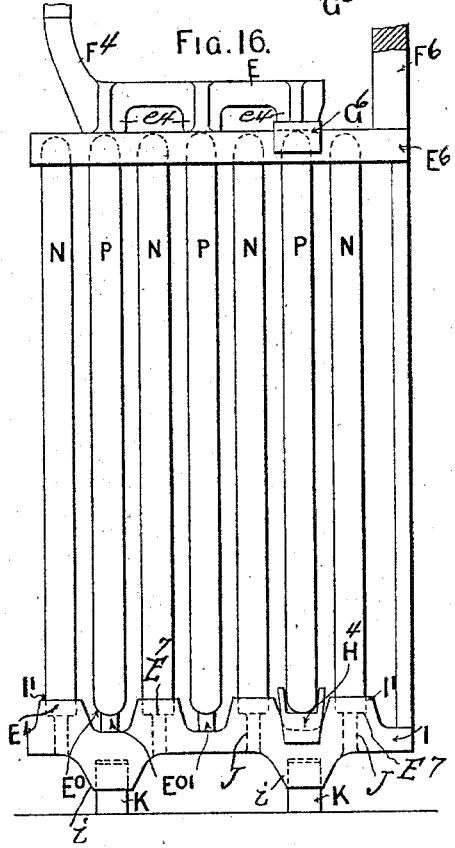
Fig. 16.
Fig. 19.
Fig. 20.
Fig. 18.
Witnesses:
Inventor,
Henry William Headland.

UNITED STATES PATENT OFFICE.

HENRY WILLIAM HEADLAND, OF LONDON, ENGLAND.

SECONDARY BATTERY.

SPECIFICATION forming part of Letters Patent No. 589,830, dated September 14, 1897.

Application filed February 11, 1896. Serial No. 578,940. (No model.)

*To all whom it may concern:*

Be it known that I, HENRY WILLIAM HEADLAND, electrical engineer, a subject of the Queen of Great Britain, residing at Leyton, London, in the county of Essex, in England, have invented certain new and useful Improvements in Secondary Batteries; and I do hereby declare the following to be a full, clear, and exact description of the said invention, such as will enable others skilled in the art to which it appertains to make and use the same.

My invention has relation to storage batteries, and more particularly to the construction of the electrodes for such batteries; and it has for its object structural features whereby a light compact cellular support for the active material is obtained.

The invention has for its further object means for electrically connecting the electrodes of like name, whereby they may be so grouped or arranged relatively to one another as to occupy the least possible space; but that my invention may be better understood I will describe the same in detail, reference being had to the accompanying drawings, in which—

Figure 1 is an elevation; Fig. 2, a vertical section taken at right angles to Fig. 1, and Fig. 3 a plan view of the conductive support for the active material. Figs. 4 and 5 are sections taken on lines $a\ b$ and $c\ d$, respectively, of Fig. 1. Fig. 6 shows in elevation a group of the electrodes, and Fig. 7 is a plan view thereof. Figs. 8 and 10 are plan views, and Figs. 9 and 11 side views, of insulations. Fig. 12 is a front elevation; Fig. 13, a sectional side elevation on line $e\ f$ of Fig. 12; Fig. 14, a horizontal section on or about on line $g\ h$ of Fig. 12, and Fig. 15 is a top plan view illustrating another mode of grouping the electrodes and means for connecting those of like name. Fig. 16 is a front elevation, Fig. 17 a top plan view, partly in section, and Fig. 16$^A$ a part sectional side elevation, illustrating still another mode of grouping the electrodes and connecting those of like name. Fig. 18 is a plan view of one of the lower connecting and supporting bars for the electrodes; and Figs. 19 and 20 are detail views of insulations to be applied, respectively, at top and bottom of the electrodes.

As usual, a battery in which electrodes constructed in accordance with my invention are employed comprises one or more positive and one or more negative electrodes, (indicated throughout the drawings by the symbols P and N, respectively.) The support for the active material, which constitutes one of the leading features of this invention, and which I may call a "grid-bar," or, for short, a "grid," in view of its cellular form, is constructed as follows, reference being had to Figs. 1 to 5, inclusive, of the drawings, it being understood that said supports are made and cast of a suitable conductive metal, as lead, in one piece: The grid G consists of a series of superposed open polygonal, preferably square, frames D and D', the latter being smaller than the former. These frames are connected together by flat bars A and B, which, together with the frames, are, for the sake of lightness, made as thin as possible consistent with the strength necessary to make them self-supporting when filled with active material.

In order to further the continuity of the active material and to expose a minimum surface of metal to the action of the acid electrolyte, I bevel the edges of the frames D and D', as also the edges of the bars A, particularly the outer edges, to or approximately to a feather or knife edge and locate the bars A and B in the planes of the diagonals of the frames, the bars A connecting the outer angles of the frames D and D', while the bars B connect the inner angles of said frames, whereby spaces or cells C are formed and a central vertical space C' extends the full length of the grid and has inwardly-projecting ribs formed by the connecting-bars B, whereby the active material, positive or negative, is firmly keyed to or held in the said spaces C and C' of the grid G, the metal thereof distributed throughout such active material and, so to speak, mere lines (outer edges of frames D and bars A) of metal exposed to the action of the exciting liquid, the frames D' being completely embedded in said material. The upper and lower frames D$^2$ have their outwardly-turned faces perfectly flat and are beveled on their inwardly-turned faces only, and on opposite sides said flat surfaces are provided with projecting walls F$^3$ F$^4$, whose opposite edges are beveled inwardly, Fig. 3. The lower projections F$^4$ serve as feet to support the electrodes clear of the bottom of the battery vessel, while in some of the grids G one of the projecting walls F³ has formed therewith a connecting-up bar or tang F at one end (more clearly shown in Fig. 7) for connecting them up by well-known means and when filled with positive or negative material constitute the electrodes P and N for storage batteries. Any desired number of these electrodes may be grouped together in a suitable vessel and suitably connected up to form a storage battery. In Figs. 6 and 7 I have shown four such electrodes—two positive and two negative electrodes P P and N N, respectively. In order that these electrodes may be grouped together so as to occupy the least possible space and in order to avoid the connecting up of each of the electrodes separately, it is necessary that two of them—as the positive electrodes P P, for instance—should be of sufficiently greater height than the negative electrodes N N to admit of the conductive connection of electrodes of like name, so that but one of a pair need be connected up, as shown in Figs. 6 and 7. To this end the electrodes are suitably spaced at bottom by means of an insulator H, Figs. 10 and 11, consisting merely of a cruciform frame into which the electrodes of like name are set diagonally opposite each other. Then the two negative electrodes N, which are of less height than the positive electrodes P, are conductively connected by means of lead connectors E', consisting of two plates $e$, that fit between the beveled projections F³ at the upper end of said electrodes N and are connected together by a tang or connecting-bar $e'$, formed integral therewith. After this a box-like insulator G', Figs. 8 and 9, similar in shape to the one shown in Figs. 10 and 11, but having an X-shaped top $g$, is placed over the connecting-piece E', so that the cross-plates $g'$ of the insulator will fit in the spaces between the four electrodes, Fig. 7, and on this insulator is finally placed a connecting-piece E, similar to the one E', whose plates $e$ are held between the projections F³ at the upper end of the positive electrodes P. In this manner the group will consist of electrodes of unlike name alternating with each other, and two such electrodes of unlike name will be provided with a connecting-up bar F and F', respectively, whereby said bars will be in line with each other and can be readily connected up in the usual manner.

Any suitable material may be used in the construction of the insulators, as celluloid, for instance.

It is obvious that in electrodes constructed as described a minimum surface of metal and a maximum surface of active material are exposed to the action of the exciting liquid, while said material is firmly keyed together and held and supported in the grid flush with its outer edges, and is so subdivided that the tendency to breaking up and falling away, as is the case when said material is used in solid masses, is practically avoided.

From the construction of the electrodes and the example of grouping such together described it will readily be understood that the mode of grouping may be varied in many ways and in such a manner as to greatly reduce the space occupied by the electrodes as compared with the space necessary for the electrodes of usual construction. Thus, for instance, in Figs. 12 to 15 I have shown an arrangement wherein one series of positive electrodes P and two series of negative electrodes N are so grouped as to take up the space that would ordinarily be occupied by two rows of such electrodes. The electrodes grouped as shown in said Figs. 12 to 15 form a compact whole, taking up the least possible space and having a uniform resistance, because the distance between the parallel surfaces of the active material is everywhere the same. As will be understood from Fig. 15, the positive electrodes P—six in all, as an example—are grouped in two series of three each, all conductively connected by a single lead conductor E² of substantially the same construction as those hereinabove described, but modified to suit the increased number of electrodes, said conductor being provided with two connecting-up tangs F. The negative electrodes N are also arranged in two series, the electrodes of each series being conductively connected by connecting-pieces E³ similar to those E², both of the connectors having two connecting-up tangs F', and the electrodes are so interlocated as to present two rows only. Insulators G² and H², modified in construction to suit the grouping of the electrodes, are inserted at top and bottom, respectively, as described in reference to Figs. 6 and 7, the electrodes G being omitted in Fig. 15 for the sake of clearness.

In Figs. 16, 16ᴬ, and 17 I have shown another mode of grouping the elements in which the rows of positive electrodes P alternate with rows of negative electrodes N. The positive electrodes P of each row of such are serially connected at top and bottom by lead bars Eˣ and E⁰, respectively, which bars may rest between the upper projections F³ and F⁴, hereinbefore mentioned, or said projections may be dispensed with and the electrodes simply placed on the lower bar E⁰ and the upper bar Eˣ laid on the upper shelves of the said electrodes, or said bars may be arranged in any other manner. The several rows of positive electrodes are conductively connected through their upper conductive bars Eˣ with a U-shaped frame E⁴, that has feet or downwardly-projecting lugs or arms $e^4$, which are soldered to the respective connecting-bars Eˣ, so that a single connecting-up tang F⁴ is required for the several rows of positive electrodes, said tang being formed on the cross-bar of the U-frame, as shown in Fig. 17. The negative electrodes N of each row are likewise serially connected at top by lead bars E⁵, all of which are united to a U-frame E⁶, in the cross-bar of which is secured or formed the connecting-up tang F⁶, Fig. 17, thus providing means whereby all of the electrodes N of the several rows are also connected up through a single tang. The negative electrodes N of a row of such are serially connected at their lower ends by a lead bar E⁷, that has depending lugs J, which fit into holes formed in a recessed portion I' of a supporting lead frame I, in which the ends of the bars are seated, which frame is provided with downward projections $i$, in which are formed sockets for the reception of feet K of a non-conductive material, preferably rubber, whereby a firm and even bearing on the bottom of the battery-box, in spite of any slight unevenness of surface, is provided, and whereby shocks to which the battery may be subjected when used for traction purposes are counteracted. Upon this lead frame I also rest the lower connecting-bars E⁰ of the rows of positive electrodes P, said bars being, however, insulated from the frame by suitable saddle-shaped insulators H⁴, Figs. 16, 16ᴬ, and 20, that straddle the frame-bars, and from the underside of the connecting-bars E⁰. At each end proximate to said insulators project lugs E⁰', that hold the rows of electrodes against endwise displacement on the frame I. At their upper ends the rows of positive electrodes P are insulated from the upper lead frame E⁶ by means of insulators G⁶, constructed to straddle the side bars or legs of said frame and have a recess in their inner face or are provided with two ears $g^6$, between which said connecting-bars Eˣ fit, as more clearly shown in Fig. 17.

For the sake of clearness I have shown only one of the insulators G⁶ in Figs. 16 and 17 and one of the insulators H⁴ in Figs. 16 and 16ᴬ, it being understood that there will be an insulator G⁶ at each end of the several bars Eˣ and an insulator H⁴ at each end of the several bars E⁵.

By means of the construction described the positive electrodes are securely held in place, yet can readily be lifted out of the frames E⁶ and I.

Having thus described my invention, what I claim as new therein, and desire to secure by Letters Patent, is—

1. In an electrode for storage batteries, a metallic grid-like support for the active material consisting essentially of a series of superposed open frames of polygonal form interconnected at their exterior and interior angles by connecting bars or posts, for the purpose set forth.

2. In an electrode for storage batteries, a metallic grid-like support for the active material consisting essentially of a series of superposed open polygonal, preferably square frames, interconnected at their exterior and interior angles by flat bars or posts lying in the planes of the diagonals of said frames, for the purpose set forth.

3. In an electrode for storage batteries, a metallic grid-like support for the active material consisting essentially of a series of superposed open frames of different diameters arranged alternately and connected at their exterior and interior angles by bars or posts, for the purpose set forth.

4. In an electrode for storage batteries, a metallic grid-like support consisting essentially of a series of superposed polygonal, preferably square, open frames having their outer edges beveled, said frames interconnected at their exterior and interior angles by flat bars or posts having their outer edges also beveled and lying in the planes of the diagonals of said frames, for the purpose set forth.

5. In an electrode for storage batteries, a metallic grid-like support consisting of a series of superposed polygonal, preferably square, open frames of different diameters arranged alternately and having their outer edges beveled, said frames interconnected at their exterior and interior angles by flat bars having their outer edges likewise beveled, said bars lying in the planes of the diagonals of said frames, for the purpose set forth.

6. In a storage battery, a group of positive and negative electrodes, conductive connections connecting electrodes of like name those connecting unlike electrodes superposed, a single connecting-up bar or tang for each set of electrodes, and insulators interposed between the conductive connections and spacing the electrodes, for the purpose set forth.

7. In a storage battery, a group of alternating positive and negative electrodes substantially square in cross-section, a single conductive connection for each set of electrodes of like name, insulators interposed between said conductive connections and spacing the electrodes, and means for connecting up the electrodes of unlike name, substantially as and for the purpose set forth.

8. In a storage battery, a group of electrodes consisting of a series of positive and a series of negative electrodes, a conductive supporting-frame for both series of electrodes, said frame provided with elastic feet, insulators for insulating the positive electrodes from the frame and from the negative electrodes, two conductive connectors connecting all the electrodes of like name together, and a connecting-up bar or tang for each of said connectors, for the purpose set forth.

9. In a storage battery, a group of electrodes consisting of a series of positive and a series of negative electrodes substantially square in cross-section, a conductive support for all the electrodes, provided with elastic feet, insulators for insulating the positive electrodes from said frame and from the negative electrodes, conductive bar-connectors connecting all the electrodes of like name together, each of said bar-connectors provided with a connecting-up bar or tang, for the purpose set forth.

10. The combination with a group of four (two positive and two negative) electrodes substantially square in cross-section, of a cruciform insulator H in which electrodes of like name are set diagonally opposite each other, a conductive connection between two such oppositely-arranged electrodes and a cruciform box-like insulator G interposed between said conductive connections and a connecting-up bar or tang for one of the positive and negative electrodes, respectively, for the purpose set forth.

HENRY WILLIAM HEADLAND.

Witnesses:
E. W. ECARLLE,
W. M. HARRIS.